United States Patent [19]
Leonheart

[11] 3,809,004
[45] May 7, 1974

[54] ALL TERRAIN VEHICLE

[76] Inventor: William H. Leonheart, 960 Washington St., San Carlos, Calif. 94070

[22] Filed: Sept. 18, 1972

[21] Appl. No.: 290,201

[52] U.S. Cl.................. 115/1 R, 180/6.2, 180/6.48, 180/22
[51] Int. Cl............................................. B60f 3/00
[58] Field of Search....... 180/6.48, 6.2, 22 R, 24.05, 180/85; 115/1 R

[56] References Cited
UNITED STATES PATENTS

| | | | |
|---|---|---|---|
| 3,653,455 | 4/1972 | Hetteen.............................. | 115/1 R |
| 2,642,144 | 6/1953 | Brewer............................ | 180/6.2 X |
| 3,506,079 | 4/1970 | Madler et al. ........................ | 180/22 |

Primary Examiner—Kenneth H. Betts
Assistant Examiner—John A. Pekar
Attorney, Agent, or Firm—Townsend & Townsend

[57] ABSTRACT

An all terrain vehicle and a suspension system for an all terrain vehicle is disclosed with a drive system that affords steerage by braking the wheels on one or the other sides of the vehicle and without turning the wheels. The improved suspension system is provided with independently suspended wheels which can have interchangeable parts with each wheel independently adjustable to adapt the vehicle for travel over relatively rough terrain or over relatively smooth terrain. Provision is made to shield the driving and suspending members for all wheels from the terrain and elements ambient to the terrain. A body is disclosed with an all terrain vehicle that is lightweight, reinforced for strength, and substantially water tight.

6 Claims, 14 Drawing Figures

PATENTED MAY 7 1974 3,809,004
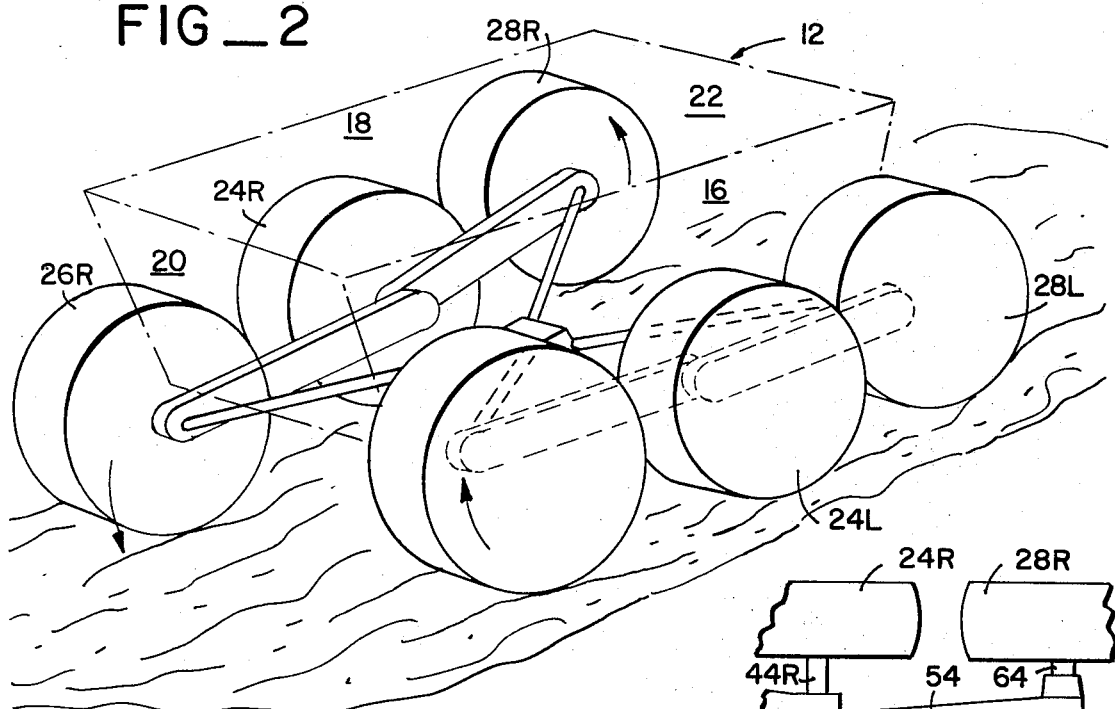
FIG_2
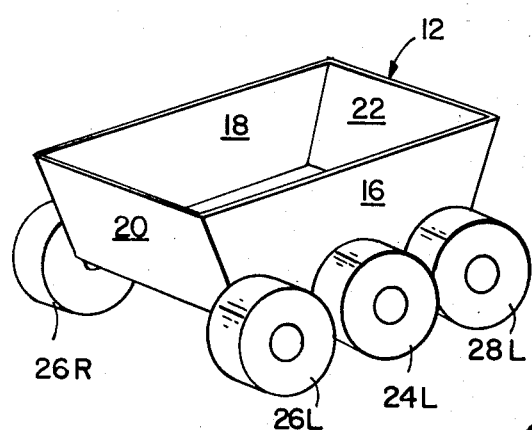
FIG_1
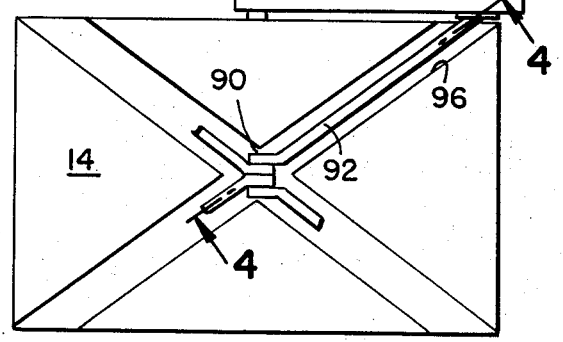
FIG_3
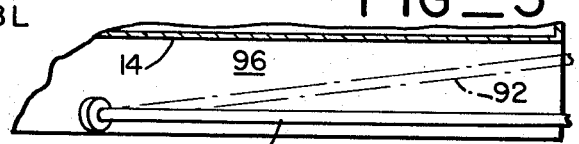
FIG_4
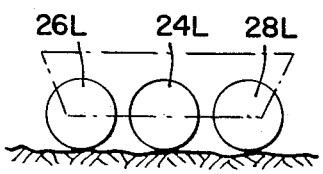
FIG_5A
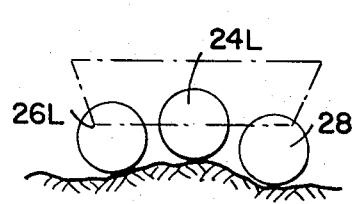
FIG_5B
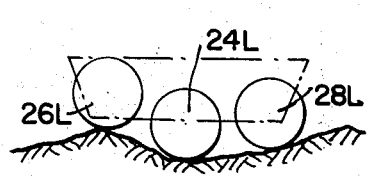
FIG_5C

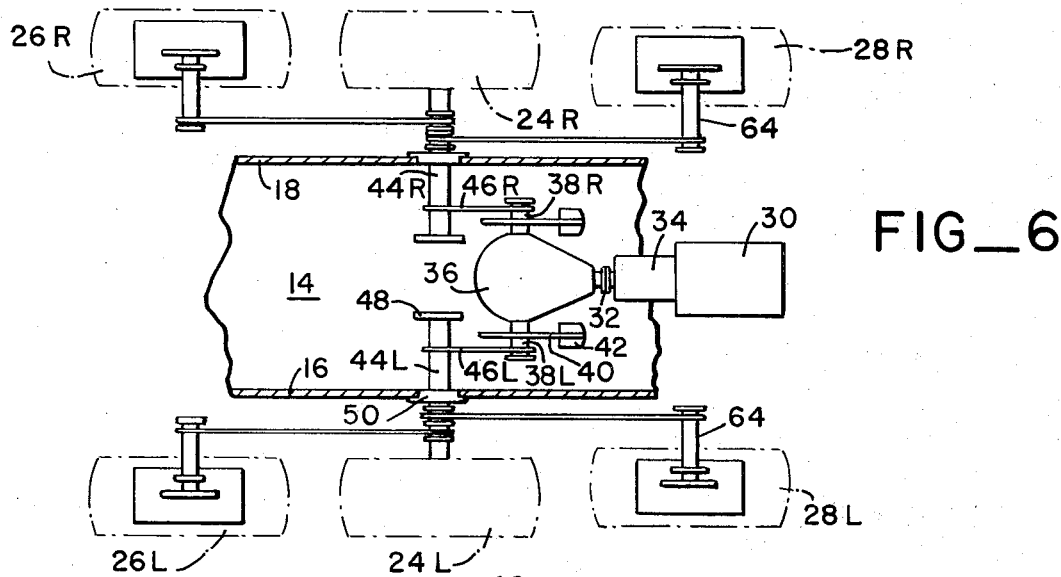
FIG_6
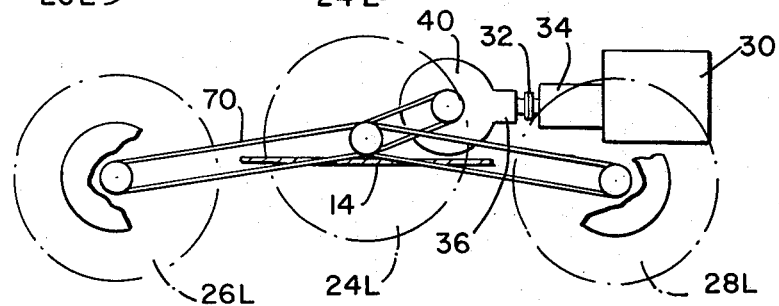
FIG_7
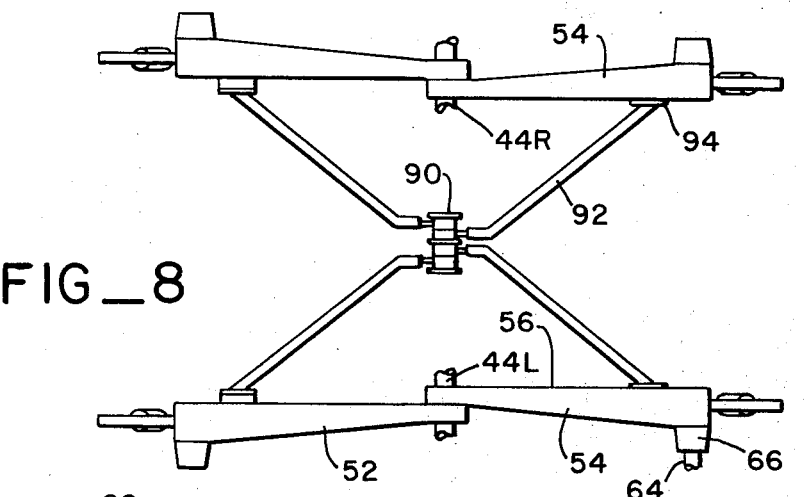
FIG_8
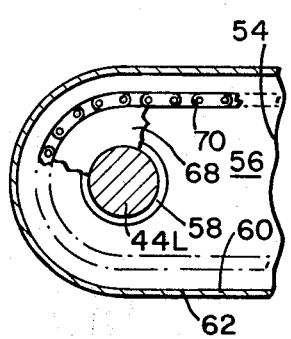
FIG_8A
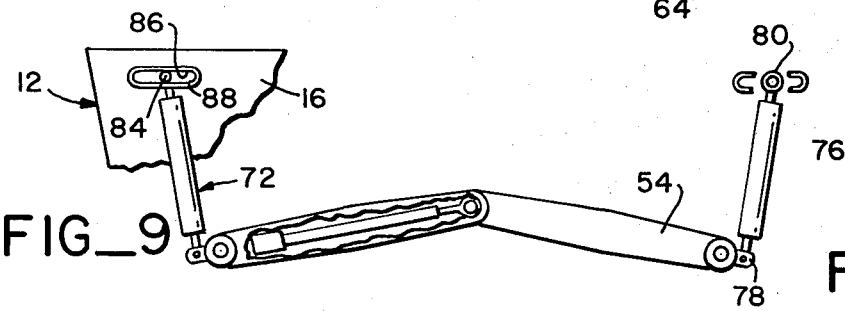
FIG_9
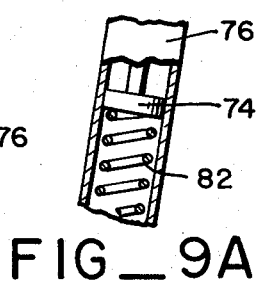
FIG_9A

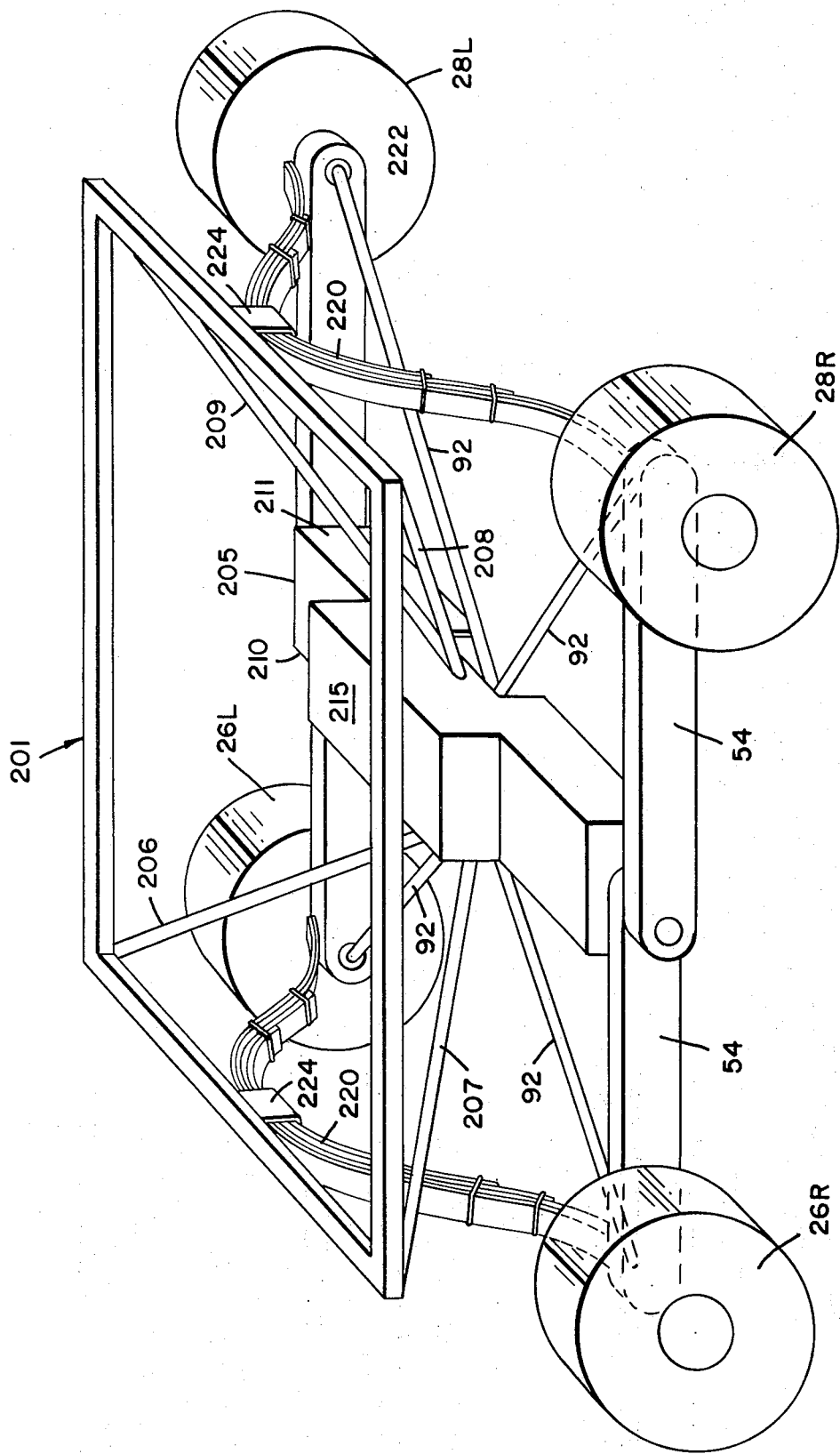
FIG_10

3,809,004

ALL TERRAIN VEHICLE

This invention relates to an all terrain vehicle and particularly to a suspension system for said vehicle.

An all terrain vehicle according to the present invention includes a water tight unitized body that is concave upward to define a cavity for carrying passengers and cargo. The body is supported for movement on the ground by a plurality of wheels or like traction members. Two separate drive systems are provided, one for the wheels on the right side of the vehicle and one for the wheels on the left side of the vehicle, and steering is achieved by controlling the speed of rotation of the wheels on the right side relative to the speed of rotation of the wheels on the left side.

An object of the present invention is to optimize the water tight character of the body by minimizing the number of moving mechanical elements that pass through the walls that define the body. This object is achieved by providing a pair of drive shafts that are co-axially mounted transverse of the body and that pass through the side walls of the body. The two shafts constitute the only movable mechanical elements that pass through the body, and the regions where the shafts transpierce the body are provided with conventional fluid tight shaft seals. Thus, but for the two shaft seals, the structure has no movable elements passing through the body, whereby the likelihood of leakage into body cavity is reduced or virtually eliminated.

Another object of the invention is to provide a suspension system for an all terrain vehicle which assures contact with the surface on which the vehicle is moving by all traction members at all times. This object is achieved by mounting central shafts rigidly with the outer ends of the shafts having a plurality of traction members on arms that are pivotally supported on their inner ends on said shafts. Each arm is resiliently biased away from the body and toward the terrain surface. The arms pivot and maintain the traction members carried on the outer ends thereof in contact with the ground at all times and irrespective of irregularities in the surface.

A further object is to provide a suspension system wherein all ground contacting traction members are powered. This object is achieved by providing within the aforementioned arms a drive train, such as a chain and sprocket drive system, between the main shaft and the remote ends of the arms on which the traction members are carried. Because the drive train is entirely enclosed within the arms, the parts thereof are not subject to damage from the terrain or element ambient to the terrain.

Yet another object of the present invention is to provide an all terrain vehicle of the type described that affords improved stability to the traction members. This object is achieved by providing a stabilizer bar for each of the above-described arms. One end of the stabilizer bar is fastened to the free end of the arm and the other end of the stabilizer bar is fastened to the body at a point laterally and longitudinally spaced from the free end. Thus movement of the arms and the traction members carried thereby is limited to a vertical plane irrespective of the roughness of the terrain over which the vehicle operates.

Yet a further object of the present invention is to provide an all terrain vehicle wherein the body is reinforced without addition of heavyweight structural members that would add to the weight of the vehicle and would protrude below it. Achievement of this object complements achievement of the next preceding object in that channels or slots are defined in the lower surface of the body and the aforementioned stabilizer bars are mounted so that they move into and out of the channels or slots as the vehicle moves over the surface. The channels are formed integrally with the body and have vertical or substantially vertical walls; such vertical walls substantially strengthen the bottom panel of the body and afford rigidity thereto.

Still another object of the present invention is to provide a suspension system for an all terrain vehicle which affords an adjustment to optimize operation of the vehicle on relatively smooth ground, on relatively rough ground, and on ground surfaces intermediate the two extremes. This object is achieved by so mounting the biasing members for the free ends of the arms that they can be adjusted to alter the spring characteristics. More specifically, the inner ends of the spring can be moved to a substantially vertical position at which the spring action is relatively rigid or to an oblique position at which the spring action is relatively soft.

A still further object of the present invention is to provide an improved drive system whereby from one prime mover the traction members on each side of the vehicle can be controlled independently of one another. Accordingly efficient and precise steering is achieved by employment of only one prime mover.

Yet another object of this invention is to provide a suspension system in which other objects, features and advantages will be more apparent after referring to the following specification and the accompanying drawings in which:

FIG. 1 is perspective view of an all terrain vehicle according to the present invention;

FIG. 2 is a partially schematic perspective view of the improved suspension system of the present invention;

FIG. 3 is a bottom view of the improved body of present invention;

FIG. 4 is a fragmentary view taken along line 4—4 of FIG. 3;

FIGS. 5A, 5B and 5C are schematic views of the traction members according to the present invention in different relative positions to accommodate different terrain surface irregularities;

FIG. 6 is a partially schematic view in plan of the drive train according to the present invention;

FIG. 7 is a side view of the drive train of FIG. 6;

FIG. 8 is a plan view of the suspension system according to the present invention;

FIG. 8A is a fragmentary view at enlarged scale of a portion of the structure of FIG. 8;

FIG. 9 is a side view of the suspension system of FIG. 8;

FIG. 9A is a fragmentary view at enlarged scale of a portion of the structure of FIG. 9; and FIG. 10 is a perspective view of an all terrain vehicle chassis with the improved suspension system of this vehicle mounted thereto and the body being omitted for purposes of clarity.

Referring more particularly to the drawings, reference numeral 12 indicates generally the body of an all terrain vehicle according to the present invention. The body is formed of a bottom wall 14 from the lateral edges of which extend side walls 16 and 18 and from the longitudinal edges of which extend a front wall 20 and a rear wall 22. The body is formed of a suitable rigid impervious material such as steel, fiberglass reinforced plastic, or the like. Accordingly, the body defines an upwardly concave cavity for passengers and/or cargo which is substantially water tight and therefor remains dry even though the vehicle is operated upon wet or swampy terrain.

The vehicle is supported for movement over terrain by suitable traction members such as rubber tired wheels. On one side of the vehicle are provided traction members 24L, 26L and 28L and on the opposite side of the vehicle are provided traction members 24R and 26R and 28R. Steering of the vehicle is achieved by altering the relative speed of the wheels on one side of the vehicle with respect to the speed of the wheels on the other side of the vehicle.

Each and every one of the traction members is powered, thereby achieving excellent traction with the terrain irrespective of the roughness or constitution of the terrain. For this purpose, there is provided a suitable prime mover 30, such as a gasoline engine or the like, from which power is supplied to a shaft 32 through a suitable gear box 34. Shaft 32 is joined to the input shaft of a differential gear 36. Differential gear 36 has two output shafts that extend laterally thereof, such shafts being identified in FIG. 6 as 38R and 38L. Rigid with each output shaft is a brake disk 40 associated with which is a caliper assembly 42. The respective caliper assemblies are individually controllable, such as by conventional hydraulic actuating mechanisms, so that one or the other of the output shafts from the transmission can be braked thereby permitting the other to rotate without restriction and to achieve steerage of the vehicle.

Journalled within body 12 are axle shafts 44L and 44R which are driven respectively by differential output shafts 38L and 38R through a suitable drive train, such as a chain and sprocket assembly indicated schematically in FIG. 6 at 46L and 46R, respectively. Axle shafts 44L and 44R are indentically mounted so that a detailed description of the mounting of one will suffice. At the inner end of each shaft is a journal bearing 48 which is rigid with bottom wall 14 on the interior of body 12. The shaft transpierces an opening in the side wall 16 and is there supported by a water tight seal bearing 50. The bearings 50 constitute the sole points at which movable members transpierce the body so that if the seals are effective the entire cavity within the body is in water tight relation to the terrain over which the vehicle moves. At the outer end of the shaft, i.e. outside of the body cavity, traction members 24L and 24R are rigidly connected so that power to the latter traction members is direct.

On the outer portion of shafts 44L and 44R, i.e. the portions of the shaft intermediate seal 50 and traction wheels 24L and 24R respectively, are supported (see FIG. 8) one end of a pair of support arms 52 and 54. The support arms are preferably of hollow construction and as shown in FIG. 8A include an inner wall 56 that is bored to admit shaft 44L therethrough. A suitable seal 58 for excluding water from the interior of the arm is provided. Surrounding the edges of wall 56 and fastened thereto in water tight relation is a peripheral flange 60 that is provided with one or more inwardly extending tapped bosses 62. A cover plate (not shown) congruent with wall 56 is provided with holes in registry with the tapped holes in bosses 62 so that the cover plate can be installed to form a substantially water tight chamber within each of the arms. At the opposite end of each of the arms, i.e. the outer or free end thereof, is supported a stub axle 64 on which the corner traction members, e.g. 28L, are fixed. Stub axle 64 is supported for rotation with respect to the outer end of housing 54 in a manner similar to that shown in FIG. 8A, there being a journal box 66 that is rigid with the arm at afford suitable space for journals and seals for the stub axle.

To establish a driving connection between shaft 44L and stub axle 64 each of the shafts is provided with a sprocket, exemplified in FIG. 8A at 68 between which sprockets extends a conventional roller chain or the like 70. Accordingly when shaft 44L is rotatably driven, shaft 64 is correspondingly driven so that all traction wheels on a given side of the vehicle operate in unison. It is to be understood that the drive train including sprocket 68 and roller chain 70 is merely exemplary of any sutiable drive train and that equivalents will occur to those skilled in the art. For example sprocket 68 can be replaced with a bevel gear and chain 70 can be replaced by a drive shaft having suitable bevel gears at opposite ends thereof for meshing with bevel gears attached to shafts 44L and 64. Additionally, v-belt drive systems can be employed in a light duty vehicles.

Although the drive system associated with traction member 28L has been disclosed in detail hereinabove, it is to be understood that traction members 26L, 26R, and 28R are driven and supported by similar structure.

Each of the corner traction members is biased downward from body 12 into contact with the terrain by a shock absorber-spring assembly 72 (see FIG. 9). Each shock absorber spring assembly includes a piston 74 which operates within a cylinder 76 containing hydraulic fluid and ported so as to damp the movement between the piston and the cylinder. The cylinder is connected to the outer end of the arm 54 by a suitable pivot connection 78 and the rod is connected to a yoke 80. Within cylinder 76 is a compression spring 82 that biases the piston outward of the cylinder and consequently biases the outer free end of arm 54 downward so that the traction member carried at the free end thereof is urged into intimate and continuous contact with the terrain on which the vehicle operates.

In FIG. 9, it can be seen that yoke 80 is provided with a pin 84 which resides in an elongate slot 86 of a member 88 that it is fixed on the exterior surface of the sidewalls. e.g. sidewall 16, of body 12. Yoke 80 is provided with suitable means for locking pin 84 at any desired position within slot 86 thereby altering the spring action afforded by spring 82 within shock absorber-spring structure 72. An equivalent of elongate slot 86 is a plate having a plurality of longitudinally spaced holes into a selected one of which can be placed pin 84. Such structure is merely exemplary of any means for moving the upper end of shock absorber-spring structure 72 longitudinally of the vehicle so as to alter the angle of the structure and thereby alter the force supplied by spring 82 on the free end of the arm. Thus, should hard spring action be desired for traverse over extremely rough ground, pin 84 is moved longitudinally toward the center of the vehicle so that shock absorber-spring structure 72 resides in a vertical or nearly vertical orientation. On the other hand, should a softer ride be desired, as when traversing relatively smooth terrain or paved surfaces, pin 84 is moved to the outer longitudinal extremity of slot 86 so that shock absorber-spring structure 72 resides in an oblique position that is offset from vertical.

For affording stability to the corner traction members 26L, 26R, 28L and 28R, there is extending from the midpoint of bottom wall 14 to each of the arms at a point adjacent the free end or outer end thereof a rigid stabilizer bar. At the longitudinal and transverse center of bottom wall 14 and on the exterior side thereof is supported a pivot pin 90. Attached to the pivot pin 90 for pivotal movement relative thereto are the inner ends of four stabilizer bars, an exemplary one of which is indicated at 92 in FIGS. 3 and 8. The outer end of stabilizer bar 92 is rigidly connected at 94 to arm 54 at a point on the arm adjacent the free end thereof. Accordingly, each of the corner traction members is supported by what can be characterized as a three-bar linkage; the first bar being constituted by arm 54, the second bar being constituted by the stabilizer bar 92, and the third bar being constituted by the portion of bottom wall 14 between pivot pin 90 and axle shaft 44R. As is known by those skilled in the art, such three-bar linkage is extremely stable and maintains the corner wheels in longitudinal alignment with the center traction members even in the presence of severe impacts from terrain irregularities such as rocks and the like.

Referring to FIGS. 6 and 8, it will be observed that each of the support arm 54, 52, each of the stabilizer bars 92, and each of the stub shafts 64 constitute identically configured assemblies. Thus in the manufacture of a vehicle according to this invention, the assembly constituting the support arm stabilizer bar and stub shaft is interchangeable. This interchangability of the support arm, stabilizer bar and stub shaft has a serendipitous feature. Typically wheels 28L and 28R will not track directly behind wheels 24L, 26L and 24R, 26R respectively. In an all terrain vehicle this non-tracking feature of the vehicle wheels enables the vehicle to obtain traction from varied portions of the terrain, regardless of the track of the vehicle.

In order to maximize the clearance between bottom wall 14 and the terrain over which the vehicle operates, to protect stabilizer bars 92, and to strengthen bottom wall 14, there is defined in the bottom wall a plurality of slots or channels 96 that correspond to the location of stabilizer bars 92. As can be seen in FIG. 3, slots 96 are in an X shaped configuration. Referring to FIG. 4, it can be seen that each slot is defined by vertically extending, spaced apart plates 98 and 100 spanning the upper edges of which is a horizontal plate 102. Plates 98 and 100 reinforce bottom wall 14 without adding materially to the weight and cost thereof. Additionally, the plates define slot 96 which, as seen in FIG. 4, permits stabilizer bar 92 to move upward into the slot, a position shown in broken lines in FIG. 4, when a traction member is moved upward against the force of spring 82 in response to passage over a terrain obstruction. Moreover, when the stabilizer bars are within slot 96, they are protected from damage by obstructions such as rocks on the terrain over which the vehicle traverses.

The operation of the present invention is as follows: When the distribution of the load within body 12 is determined, and the relative roughness of the terrain over which the vehicle will travel is established, pins 84 on the respective shock absorber-spring structure 72 are positioned within slots 86. It is preferred that laterally opposed pairs of the shock absorber-spring structures be positioned similarly. If, for example, the vehicle is to be loaded most heavily at the rear, pins 84 on the rearward shock absorber-spring structures are preferably moved toward the longitudinal center of the vehicle so that the shock absorber-spring structures are more nearly vertical. In such supposed loading condition, the shock absorber-spring structures associated with the relatively lightly loaded end of the vehicle can preferably be moved to some position oblique of the true vertical, i.e. a position wherein pin 84 resides outward of the inner extremity of slot 86. With the shock absorber-spring structures adjusted as above, prime mover 30 is activated and speed changer 34 is suitably positioned whereupon the vehicle proceeds. When turning is desired, the appropriate brake caliper structure 42 is operated so as to brake one or the other of differential shafts 38L and 38R, whereupon the wheels on the same side of the vehicle are correspondingly braked. Because of the presence of shock absorber-spring structures 72, and particularly compression spring 82, all six traction members are maintained in ground contact at all times. For example, in FIG. 5A, where the terrain is more or less smooth, the traction members 24L, 26L and 28L are at the same horizontal level. When the vehicle has moved centrally of an obstruction as shown in FIG. 5B, the front and rear wheels 26L and 28L are urged downward into contact with the terrain. When the vehicle is in a depression, exemplified in FIG. 5C, traction members 26L and 28L yield upwardly and compress springs 82. On such upwardly yielding position, stabilizer bars 92 enter slots 96 to permit contact with the terrain by all traction members at all times. Because of the presence of stabilizer bars 92, the front and rear traction members remain in longitudinal alignment with the center traction members 24L and 24R, thereby improving the controlability of the vehicle and materially lengthening the life of the moving parts thereof.

Should the vehicle traverse wet or swampy terrain, there is substantially no likelihood of entry of water into body 12 because there are only two moving elements that transpierce the body and those elements, axle shafts 44L and 44R, are provided with water tight seals 50. Because long wearing shaft seals are presently available, the vehicle remains water tight without excessive maintenance. As the vehicle traverses the terrain, the character of the terrain may change in which event the angle of shock absorber-spring structures 72 can be changed by altering the position of pin 84 in slot 86. Thus, a vehicle according to the present invention has the ability to be adapted to terrain of differing degrees of roughness and in all cases continuous contact with the terrain is afforded from all six of the traction members.

Thus, it will be seen that the present invention provides an all terrain vehicle of exceptional strength and versatility. The adjustability of shock absorber-spring structures 72 permits a given vehicle to be adapted to virtually any type of terrain. Cooperation between stabilizer bars 92 and slots 96 in bottom wall 14 maximize the clearance between the body of the vehicle and the terrain and protect the stabilizer bars from possible damage. The body is reinforced by the presence of slots 96 and is maintained in a dry condition at all times since only two moving members (shafts 44L and 44R) pass through the walls of the body. Conventional shaft seals on the shafts prevent ingress of water to the body cavity so that the occupants thereof remain dry. Moreover, because of the simplified steering system afforded by differential 36, brake discs 40 and caliper assemblies 42, there are no protruding fragile steering parts.

It should be realized that the suspension system of the present invention is capable of being embodied in a number of different embodiments. For example, the suspension system could be attached to a chassis and utilized with four wheels only as illustrated in the embodiment of FIG. 10.

Referring to FIG. 10, a rectangular body supporting frame 201 is illustrated. Frame 201, rectangular in section, is supported from a drive box 205, by support bars 206-209. Each of the bars 206-209 attaches at a corner of the frame 201 at the one end and angles down to a central position on the sidewall of drive box 205 on the opposite end. Bars 206 and 207 fastened to side 210 of drive box 205 similarly, bars 208 and 209 fasten to side 211 of drive box 205. It can thus be seen that the frame 201 forms a truss in conjunction with box 205 through support bars 206-209.

Drive box 205 is furnished with an opening 215. Opening 215 permits a subsequently attached body to be communicated to the opening 215 and to permit a prime mover to drive the wheels on either side of the all terrain vehicle.

The suspension system is analogous to that previously described. Broadly it includes arms 54, stabilizer bars 92 and wheels 26R, 28R, 26L and 28L.

The biased suspension of each of the wheels and support arms 54 from frame 201 has been modified. Specifically, a leaf spring, is provided to independently suspend each of the wheels. Specifically, the spring is attached at its ends 222 to the ends of support arms 54 and fastened at its intermediate portion 224 to frame 201.

It should be noted that in the embodiment of FIG. 10 wheels 24 have been omitted.

Thus through reference to FIG. 10, it will be seen that this invention will admit of a number of embodiments. Changes in the means of biasing the wheels with respect to a chassis or attached body of an all terrain vehicle can easily be made. For example, torsion bars could be substituted for the leaf spring 220. Likewise other modifications can be made to this invention without departing from the true spirit and scope of the invention.

What is claimed is:

1. An all terrain vehicle comprising a body having a bottom wall and side walls extending upward from the edges of the bottom wall to form an upward concave impervious body cavity, portions of said side walls adjacent said bottom wall defining laterally opposed openings therethrough, first and second drive shafts transpiercing said openings and being journalled for rotation relative said body, first and second means for sealing said shafts at said openings so as to prevent fluid passage therethrough, each said shaft having an inner end within the body cavity and an outer end exterior thereof, means within said body cavity for rotatively driving said shafts, first and second traction members on the outer ends of respective shafts for engagement with the terrain on which the vehicle operates, at least one arm having a first end pivotally mounted on the outer end of said shaft and a second end remote from said first end, a traction member journalled for rotation at the second end of said arm, means associated with said arm for establishing a driving connection between the outer end of said shaft and last said traction member, means for resiliently biasing said arm relative said body toward the terrain on which the vehicle operates; a stabilizer bar having an outer end joined to said arm at a point adjacent the second end thereof, said stabilizer bar having an inner end remote from said outer end, and means for pivotally connecting said inner end to said bottom wall for pivotally connecting said inner end to said bottom wall for pivotal movement about an axis parallel to and in substantial vertical alignment with said drive shafts; and, a portion of said bottom wall defining a downward concave slot, said slot extending from said pivotal connecting means to the edge of said body adjacent said point so that said stabilizer bar can enter said slot.

2. A vehicle according to claim 1 wherein said slot defining portion of said bottom wall includes spaced apart generally vertically extending plates that afford reinforcement to said bottom wall.

3. A vehicle according to claim 2 wherein said biasing means comprises a compression spring having upper and lower ends, means for fastening said upper end to said body at preselected locations along a horizontal path on said body and means for fastening said lower end to said arm at a region adjacent the second end of said arm.

4. In an all terrain vehicle comprising a body having a bottom wall and side walls extending upward from the edges of the bottom wall to form an upward concave impervious body cavity, portions of said side walls adjacent said bottom wall defining laterally opposed openings therethrough, first and second drive shafts transparencing said openings and being journalled for rotation relative to said body, first and second means for sealing said shafts at said openings so as to prevent fluid passage therethrough, each said shaft having an inner end within said body cavity and an outer end exterior thereof, means within said body cavity for rotatively driving said shafts, an arm having a first end pivotally mounted on the outer end of said shaft and a second end remote from said first end, a traction member journalled for rotation at the second end of said arm, means associated with said arm for establishing a driving connection between the outer end of said shaft and said traction member, means for resiliently biasing said arm relative to said body toward the terrain on which said vehicle operates, a stabilizer bar having an outer end joined to said arm at a point adjacent the second end thereof, said stabilizer bar having an inner end remote from said outer end, and means for pivotally connecting said inner end to said bottom wall for pivotal movement about an axis parallel to and in substantial vertical alignment with said drive shafts; and, a portion of said bottom wall defining a downward concave slot, aid slot extending from said pivotal connecting means to the edge of said body adjacent said points so that said stabilizer bar can enter said slot.

5. A vehicle according to claim 4 wherein said slot defining portion of said bottom wall includes spaced apart generally vertically extending plates that afford reinforcement to said bottom wall.

6. A vehicle according to claim 4 wherein said biasing means comprises a compression spring having an upper and lower end; means for fastening said upper end to said body at preselected locations along a horizontal path on said body; and, means for fastening said lower end to said arm at a region adjacent the second end of said arm.

* * * * *